US009100072B2

(12) United States Patent
Sampath et al.

(10) Patent No.: US 9,100,072 B2
(45) Date of Patent: Aug. 4, 2015

(54) APPARATUS AND METHODS FOR WIRELESS COMMUNICATION IN POWER-RESTRICTED FREQUENCY BANDS

(71) Applicant: QUALCOMM Incorporated, San Diego, CA (US)

(72) Inventors: Hemanth Sampath, San Diego, CA (US); Eugene Jong-Hyon Baik, San Diego, CA (US); Sameer Vermani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 40 days.

(21) Appl. No.: 14/022,042

(22) Filed: Sep. 9, 2013

(65) Prior Publication Data
US 2014/0079145 A1    Mar. 20, 2014

Related U.S. Application Data

(60) Provisional application No. 61/701,539, filed on Sep. 14, 2012.

(51) Int. Cl.
*H04L 27/28* (2006.01)
*H04B 7/06* (2006.01)
*H04B 7/08* (2006.01)

(52) U.S. Cl.
CPC ............ *H04B 7/0602* (2013.01); *H04B 7/0811* (2013.01); *H04B 7/0814* (2013.01)

(58) Field of Classification Search
CPC ............... H04B 7/0691; H04B 7/0619; H04L 25/0204; H04L 25/0226; H04L 27/2647
USPC .......................... 375/260, 267, 219; 370/477; 455/133–135, 67.13, 67.14, 101, 513
See application file for complete search history.

(56) References Cited

U.S. PATENT DOCUMENTS

| 7,486,720 | B2 * | 2/2009 | Molisch et al. ............... 375/219 |
| 8,064,861 | B2 | 11/2011 | Ruijter |
| 2005/0286562 | A1 * | 12/2005 | Nakao et al. .................. 370/477 |
| 2012/0044108 | A1 | 2/2012 | Frigon et al. |
| 2012/0207140 | A1 | 8/2012 | Yu et al. |
| 2013/0128807 | A1 | 5/2013 | Vermani et al. |

OTHER PUBLICATIONS

Sanayei, S.; Nosratinia, A., "Antenna selection in MIMO systems," Communications Magazine, IEEE, vol. 42, No. 10, pp. 68,73, Oct. 2004.*
Eberli S., et al., "Implementation of a 2 x 2 MIMO-OFDM receiver on an application specific processor," Microelectronics Journal, vol. 40, 2009, pp. 1642-1649.

* cited by examiner

*Primary Examiner* — Daniel Washburn
*Assistant Examiner* — Fitwi Hailegiorgis
(74) *Attorney, Agent, or Firm* — Knobbe, Martens, Olson & Bear, LLP

(57) ABSTRACT

Apparatuses, methods, and devices for wireless communication. One aspect of the subject matter described in the disclosure provides a method of selecting one of a plurality of antennas. The method includes receiving, at a first antenna, a first training field of a training frame. The method further includes receiving, at a second antenna, a second training field of the training frame. The method further includes selecting one of the first and second antennas based on at least one training field.

33 Claims, 11 Drawing Sheets

APPARATUS AND METHODS FOR WIRELESS COMMUNICATION IN POWER-RESTRICTED FREQUENCY BANDS

CROSS-REFERENCE TO RELATED APPLICATIONS

The present application claims priority to provisional U.S. Application Ser. No. 61/701,539, entitled "Apparatus and Methods for Wireless Communication in Power-Restricted Frequency Bands," filed Sep. 14, 2012, assigned to the assignee hereof and incorporated herein by reference in its entirety.

FIELD

The present application relates generally to wireless communications, and specifically to systems, methods, and devices to enable wireless communication in power-restricted frequency bands. Certain aspects herein relate to antenna selection in orthogonal frequency-division multiplexing (OFDM) communications.

BACKGROUND

In many telecommunication systems, communications networks are used to exchange messages among several interacting spatially-separated devices. Networks may be classified according to geographic scope, which could be, for example, a metropolitan area, a local area, a personal area, or a broad area that links multiple boundaries. Such networks may be designated respectively as metropolitan area network (MAN), local area network (LAN), personal area network (PAN), or wide area network (WAN). Networks also differ according to the switching or routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile with dynamic connectivity needs or if the network architecture is formed in an ad hoc, rather than fixed, topology. Wireless networks employ intangible physical media in an unguided propagation mode using electromagnetic waves in the radio, microwave, infra-red, optical, etc. frequency bands. When compared to fixed wired networks, wireless networks advantageously facilitate user mobility and rapid field deployment.

The devices in a wireless network may transmit or receive information between each other. The information may include packets, which may be referred to as data units. The packets may include overhead information (e.g., headers, packet properties, etc.) that helps in routing the packet through the network, identifying the data in the packet, processing the packet, etc. The packets may also include data, such as user information, multimedia content, etc.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description," one will understand how the features of this invention provide advantages, e.g., antenna selection and wireless communication in power-restricted frequency bands.

One aspect of the subject matter described in the disclosure provides a method of selecting one of a plurality of antennas. The method includes receiving, at a first antenna, a first training field of a training frame. The method further includes receiving, at a second antenna, a second training field of the training frame. The method further includes selecting one of the first and second antennas based on at least one training field.

Another aspect of the subject matter described in the disclosure provides a method of wireless communication. The method includes generating a training frame including a first and second training field. The method further includes transmitting the training frame to a wireless device including a plurality of antennas. The training frame includes a number of training fields equal to or greater than two times the number of the plurality of antennas.

Another aspect of the subject matter described in the disclosure provides a wireless device configured to select one of a plurality of antennas. The device includes a first antenna configured to receive a first training field of a training frame. The device further includes a second antenna configured to receive a second training field of the training frame. The device further includes a processor configured to select one of the first and second antenna based on at least one training field.

Another aspect of the subject matter described in the disclosure provides a device configured to communicate wirelessly. The device includes a processor configured to generate a training frame including a first and second training field. The device further includes a transmitter configured to transmit the training frame to a wireless device including a plurality of antennas. The training frame includes a number of training fields equal to or greater than two times the number of the plurality of antennas.

Another aspect of the subject matter described in the disclosure provides an apparatus for wireless communication. The apparatus includes first means for receiving a first training field of a training frame. The apparatus further includes second means for receiving a second training field of the training frame. The apparatus further includes means for selecting one of the first and second means for receiving, based on at least one training field.

Another aspect of the subject matter described in the disclosure provides an apparatus for wireless communication. The apparatus includes means for generating a training frame including a first and second training field. The apparatus further includes means for transmitting the training frame to a wireless device including a plurality of antennas. The training frame includes a number of training fields equal to or greater than two times the number of the plurality of antennas.

Another aspect of the subject matter described in the disclosure provides a non-transitory computer-readable medium including code that, when executed, causes an apparatus to receive, at a first antenna, a first training field of a training frame. The medium further includes code that, when executed, causes the apparatus to receive, at a second antenna, a second training field of the training frame. The medium further includes code that, when executed, causes the apparatus to select one of the first and second antenna based on at least one training field.

Another aspect of the subject matter described in the disclosure provides a non-transitory computer-readable medium including code that, when executed, causes an apparatus to generate a training frame including a first and second training field. The medium further includes code that, when executed, causes the apparatus to transmit the training frame to a wireless device including a plurality of antennas. The training frame includes a number of training fields equal to or greater than two times the number of the plurality of antennas.

DETAILED DESCRIPTION

Figure 1:
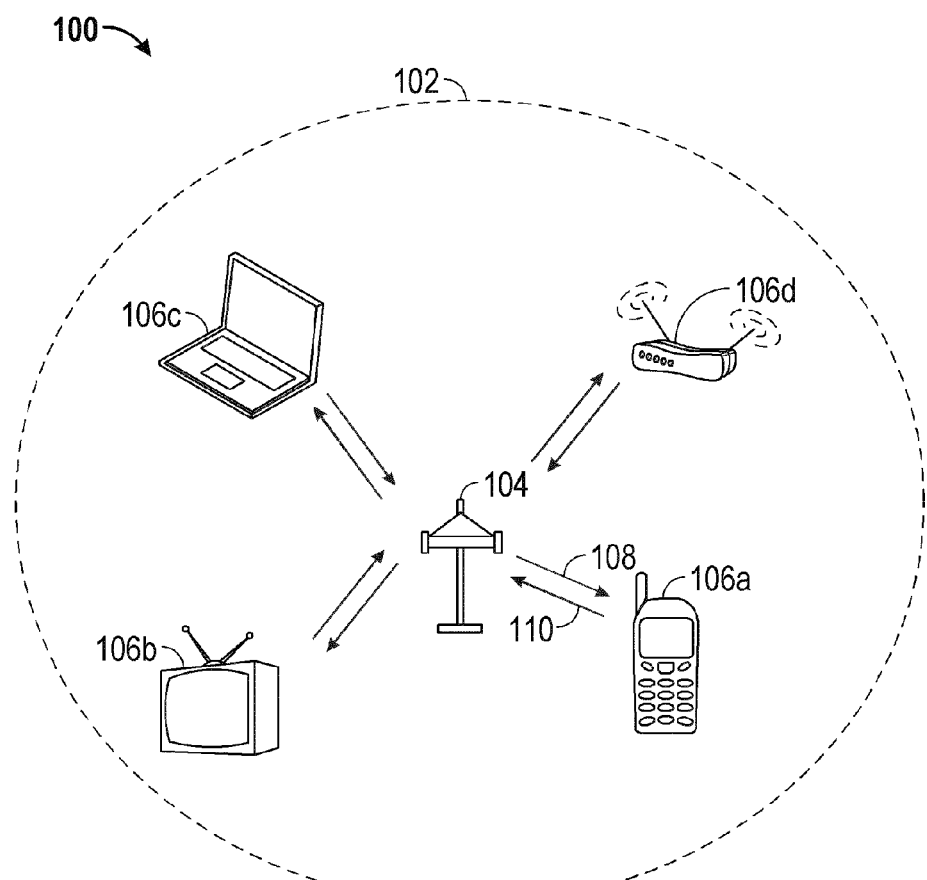
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure, rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ac protocol. The communication standard can include an ultra-wideband (UWB) standard.

In some aspects, wireless signals in a 6-9 GHz band may be transmitted using orthogonal frequency-division multiplexing (OFDM), direct-sequence spread spectrum (DSSS) communications, a combination of OFDM and DSSS communications, or other schemes. Implementations may be used in applications where transmit power is restricted, such as, for example, short-range wireless personal area network (WPAN) communications. Advantageously, aspects of certain devices may consume less power than devices implementing other wireless protocols and/or may be used to transmit wireless signals within relatively low transmit power rules, regulations, or restrictions.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, an STA may be a laptop computer, a personal digital assistant (PDA), a mobile phone, etc. An STA could connect to an AP via a WiFi (e.g., IEEE 802.11 protocol such as 802.11ac) compliant wireless link to obtain connectivity to the Internet or to other wide area networks. In some implementations, an STA may also be used as an AP.

An access point ("AP") may also include, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also include, be implemented as, or known as an access terminal ("AT"), a subscriber station, a subscriber unit, a mobile station, a remote station, a remote terminal, a user terminal, a user agent, a user device, user equipment, or some other terminology. In some implementations, an access terminal may include a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system ("GPS") device, or any other suitable device that is configured to communicate via a wireless medium.

As discussed above, certain of the devices described herein may implement an 802.11 standard. Such devices, whether used as an STA, AP, or other device, may be used for smart metering or in a smart grid network. Such devices may provide sensor applications or be used in home automation. The devices may instead or in addition be used in a healthcare context, e.g., for personal healthcare. They may also be used for surveillance, to enable extended-range Internet connectivity (e.g., for use with hotspots), or to implement machine-to-machine communications.

Certain of the devices described herein may further implement Multiple Input Multiple Output (MIMO) technology and be implemented as part of the 802.11 standard. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, i.e., spatial channels or streams, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

FIG. 1 illustrates an example of a wireless communication system 100 in which aspects of the present disclosure may be employed. The wireless communication system 100 may operate pursuant to a wireless standard, for example the 802.11ac standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. As another example, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
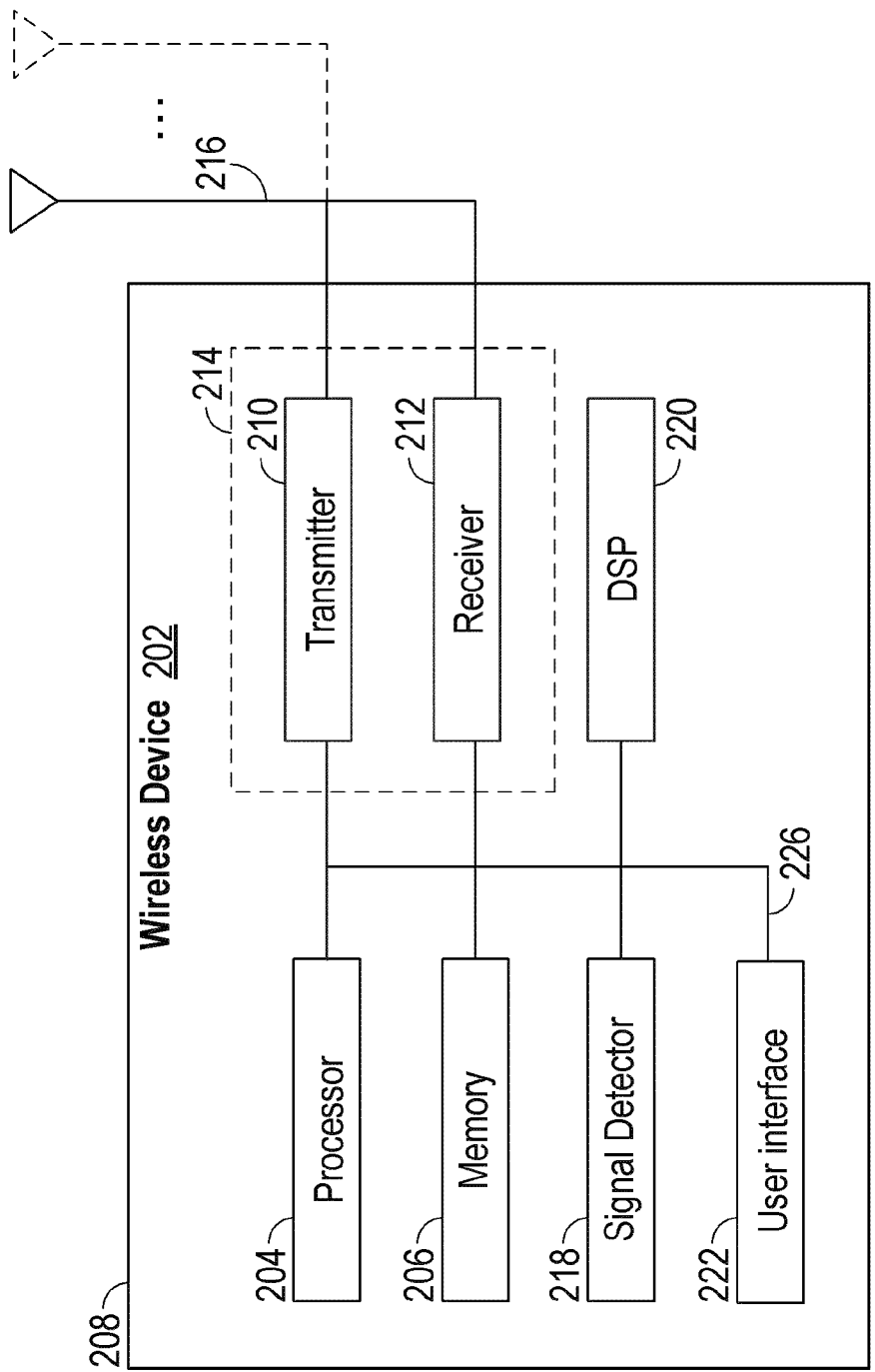
FIG. 2 shows a functional block diagram of an exemplary wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may include the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may include or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., source code, binary code, executable code, or any other suitable code format). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density, and other signals. The wireless device 202 may also include a digital signal processor (DSP) 220 for processing signals. The DSP 220 may be configured to generate a data unit for transmission. In some aspects, the data unit may include a physical layer data unit (PPDU). In some aspects, the PPDU is referred to as a packet.

The wireless device 202 may further include a user interface 222 in some aspects. The user interface 222 may include a keypad, a microphone, a speaker, a display, or any other element or component that conveys information to a user of the wireless device 202 or receives input from the user.

The various components of the wireless device 202 may be coupled together by a bus system 226. The bus system 226 may include a data bus, for example, as well as a power bus, a control signal bus, and a status signal bus. Those of skill in the art will appreciate that the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements. Furthermore, the processor 204 may be used to implement any of the components, modules, circuits, or the like described below, or each may be implemented using a plurality of separate elements.

Figure 3:
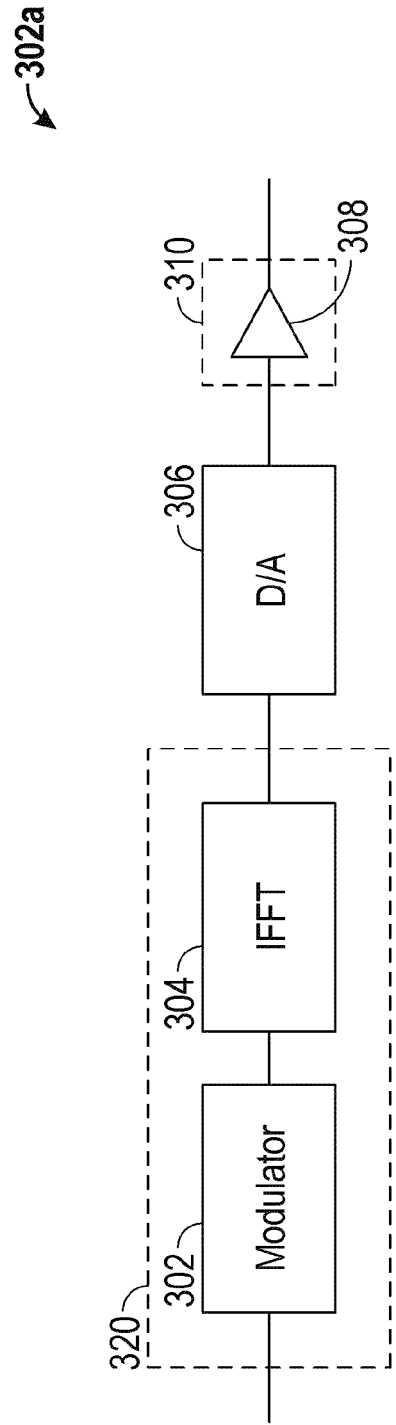
FIG. 3 shows a functional block diagram of exemplary components that may be utilized in the wireless device of FIG. 2 to transmit wireless communications.

As discussed above, the wireless device 202 may include an AP 104 or an STA 106, and may be used to transmit and/or receive communications. FIG. 3 illustrates various components that may be utilized in the wireless device 202 to transmit wireless communications. The components illustrated in FIG. 3 may be used, for example, to transmit OFDM communications. In some aspects, the components illustrated in FIG. 3 are used to generate and transmit packets having an adjustable preamble, as will be discussed in additional detail below. For ease of reference, the wireless device 202 configured with the components illustrated in FIG. 3 is hereinafter referred to as a wireless device 302a.

The wireless device 302a may include a modulator 302 configured to modulate bits for transmission. For example, the modulator 302 may determine a plurality of symbols from bits received from the processor 204 (FIG. 2) or the user interface 222 (FIG. 2), for example, by mapping bits to a plurality of symbols according to a constellation. The bits may correspond to user data or to control information. In some aspects, the bits are received in codewords. In one aspect, the modulator 302 includes a QAM (quadrature amplitude modulation) modulator, such as a 16-QAM modulator or a 64-QAM modulator. In other aspects, the modulator 302 includes a binary phase-shift keying (BPSK) modulator or a quadrature phase-shift keying (QPSK) modulator.

The wireless device 302a may further include a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there may be multiple transform modules (not shown) that transform units of data of different sizes. In some implementations, the transform module 304 may be itself configured to transform units of data of different sizes. For example, the transform module 304 may be configured with a plurality of modes, and it may use a different number of points to convert the symbols in each mode. For example, the IFFT may have a mode where 256 points are used to convert symbols being transmitted over 256 tones (i.e., subcarriers) into a time domain, a mode where 512 points are used to convert symbols being transmitted over 512 tones into a time domain, and/or a mode where 1,024 points are used to convert symbols being transmitted over 1,024 tones into a time domain. The number of points used by the transform module 304 may be referred to as the size of the transform module 304.

In FIG. 3, the modulator 302 and the transform module 304 are illustrated as being implemented in the DSP 320. In some aspects, however, one or both of the modulator 302 and the transform module 304 are implemented in the processor 204 or in another element of the wireless device 302a (e.g., see description above with reference to FIG. 2).

As discussed above, the DSP 320 may be configured to generate a data unit for transmission. In some aspects, the modulator 302 and the transform module 304 may be configured to generate a data unit including a plurality of fields including control information and a plurality of data symbols. The fields including the control information may include one or more training fields (e.g., short training fields), for example, and one or more signal (SIG) fields. Each of the training fields may include a known sequence of values or symbols (e.g., shorts). Each of the SIG fields may include information about the data unit, for example, a description of a length or data rate of the data unit.

Returning to the description of FIG. 3, the wireless device 302a may further include a digital to analog converter 306 configured to convert the output of the transform module into an analog signal. For example, the time-domain output of the transform module 306 may be converted to a baseband OFDM signal by the digital to analog converter 306. The digital to analog converter 306 may be implemented in the processor 204 or in another element of the wireless device 202. In some aspects, the digital to analog converter 306 is implemented in the transceiver 214 (FIG. 2) or in a data transmit processor.

The analog signal may be wirelessly transmitted by the transmitter 310. The analog signal may be further processed before being transmitted by the transmitter 310, for example, by being filtered or by being upconverted to an intermediate or carrier frequency. In the aspect illustrated in FIG. 3, the transmitter 310 includes a transmit amplifier 308. Prior to being transmitted, the analog signal may be amplified by the transmit amplifier 308. In some aspects, the transmit amplifier 308 includes a low-noise amplifier (LNA) (not pictured).

The transmitter 310 is configured to transmit one or more packets or data units in a wireless signal based on the analog signal. The data units may be generated using the processor 204 (FIG. 2) and/or the DSP 320, for example, using the modulator 302 and the transform module 304 as discussed above. The data units that may be generated and transmitted are described in additional detail below with respect to FIGS. 5-14.

Figure 4:
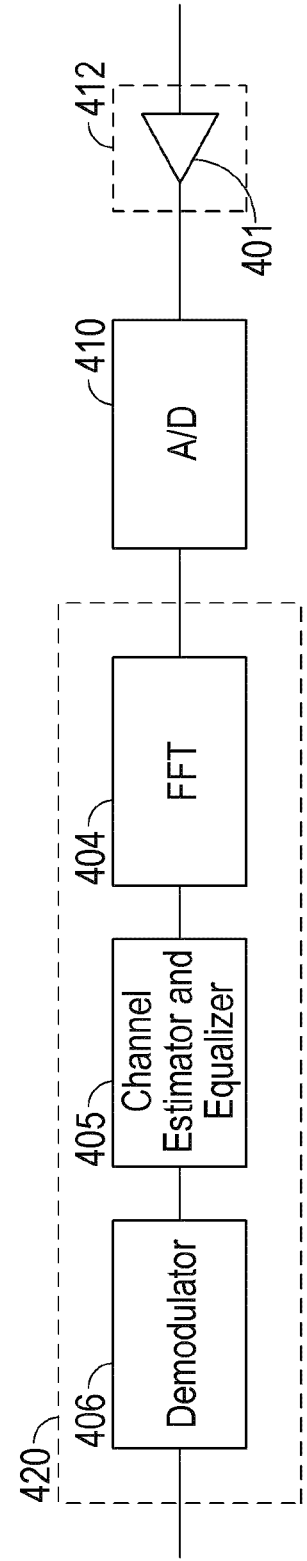
FIG. 4 shows a functional block diagram of exemplary components that may be utilized in the wireless device of FIG. 2 to receive wireless communications, according to an embodiment.

FIG. 4 illustrates various components that may be utilized in the wireless device 202 to receive wireless communications, according to an embodiment. The components illustrated in FIG. 4 may be used, for example, to receive OFDM communications. In some aspects, the components illustrated in FIG. 4 are used to receive data units having an adjustable preamble, as will be discussed in additional detail below. For example, the components illustrated in FIG. 4 may be used to receive data units transmitted by the components discussed above with respect to FIG. 3. For ease of reference, the wireless device 202 configured with the components illustrated in FIG. 4 is hereinafter referred to as a wireless device 402b.

The receiver 412 is configured to receive one or more packets or data units in a wireless signal. Data units that may be received and decoded or otherwise processed as discussed below are described in additional detail with respect to FIGS. 5-14.

In the aspect illustrated in FIG. 4, the receiver 412 includes a receive amplifier 401. The receive amplifier 401 may be configured to amplify the wireless signal received by the receiver 412. In some aspects, the receiver 412 is configured to adjust the gain of the receive amplifier 401 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 401 includes a low-noise amplifier (LNA).

The wireless device 402b may include an analog to digital converter 410 configured to convert the amplified wireless signal from the receiver 412 into a digital representation thereof. The wireless signal may also be processed by the analog to digital converter 410 before being converted, for example, by being filtered or by being downconverted to an intermediate or baseband frequency. The analog to digital converter 410 may be implemented in the processor 204 (FIG. 2) or in another element of the wireless device 402b. In some aspects, the analog to digital converter 410 is implemented in the transceiver 214 (FIG. 2) or in a data receive processor.

The wireless device 402b may further include a transform module 404 configured to convert the representation of the wireless signal into a frequency spectrum. In FIG. 4, the transform module 404 is illustrated as being implemented by a fast Fourier transform (FFT) module. As described above with reference to FIG. 3, the transform module 404 may be configured with a plurality of modes and may use a different number of points to convert the signal in each mode. For example, the transform module 404 may have a mode where 256 points are used to convert a signal received over 256 tones into a frequency spectrum, a mode where 512 points are used to convert a signal received over 512 tones into a frequency spectrum, and/or a mode where 1,024 points are used to convert a signal received over 1,024 tones into a frequency spectrum. The number of points used by the transform module 404 may be referred to as the size of the transform module 404. In some aspects, the transform module 404 may identify a symbol for each point that it uses.

The wireless device 402b may further include a channel estimator and equalizer 405 configured to form an estimate of the channel over which the data unit is received and to remove certain effects of the channel based on the channel estimate. For example, the channel estimator 405 may be configured to approximate a function of the channel, and the channel equalizer may be configured to apply an inverse of that function to the data in the frequency spectrum.

In some aspects, the channel estimator and equalizer 405 uses information in one or more received training fields, such as a long training field (LTF), to estimate the channel. The channel estimate may be formed based on one or more LTFs received at the beginning of the data unit. This channel estimate may thereafter be used to equalize data symbols that follow the one or more LTFs. After a certain period of time or after a certain number of data symbols, one or more additional LTFs may be received in the data unit. The channel estimate may be updated or a new estimate formed using the additional LTFs. This new or updated channel estimate may be used to equalize data symbols that follow the additional LTFs. In some aspects, the new or updated channel estimate is used to re-equalize data symbols preceding the additional LTFs. Those having ordinary skill in the art will understand methods for forming a channel estimate.

The wireless device 402b may further include a demodulator 406 configured to demodulate the equalized data. For example, the demodulator 406 may determine a plurality of bits from symbols output by the transform module 404 and the channel estimator and equalizer 405, for example, by reversing a mapping of bits to a symbol in a constellation. The bits may be processed or evaluated by the processor 204 (FIG. 2) or used to display or otherwise output information to the user interface 222 (FIG. 2). In this way, data and information may be decoded. In some aspects, the bits correspond to codewords. In one aspect, the demodulator 406 includes a QAM (quadrature amplitude modulation) demodulator, e.g., a 16-QAM demodulator or a 64-QAM demodulator. In other aspects, the demodulator 406 includes a binary phase-shift keying (BPSK) demodulator or a quadrature phase-shift keying (QPSK) demodulator.

In FIG. 4, the transform module 404, the channel estimator and equalizer 405, and the demodulator 406 are illustrated as being implemented in a DSP 420. In some aspects, however, one or more of the transform module 404, the channel estimator and equalizer 405, and the demodulator 406 are implemented in the processor 204 (FIG. 2) or in another element of the wireless device 202 (FIG. 2).

As discussed above, the wireless signal received at the receiver 212 includes one or more data units. Using the functions or components described above, the data units or data symbols therein may be decoded, evaluated, or otherwise processed. For example, the processor 204 (FIG. 2) and/or the DSP 420 may be used to decode data symbols in the data units using the transform module 404, the channel estimator and equalizer 405, and the demodulator 406.

Data units exchanged by the AP 104 and the STA 106 may include control information or data, as discussed above. At the physical (PHY) layer, these data units may be referred to as physical layer protocol data units (PPDUs). In some aspects, a PPDU may be referred to as a packet or physical layer packet. Each PPDU may include a preamble and a payload. The preamble may include training fields and a SIG field. The payload may include a Media Access Control (MAC) header or data for other layers, and/or user data, for example. The payload may be transmitted using one or more data symbols. The systems, methods, and devices herein may utilize data units with training fields whose peak-to-power ratio has been minimized.

The wireless device 302a shown in FIG. 3 shows an example of a single transmit chain to be transmitted over an antenna. In some implementations, the wireless device 302a may implement a portion of a MIMO system using multiple antennas to simultaneously transmit data.

Figure 5:
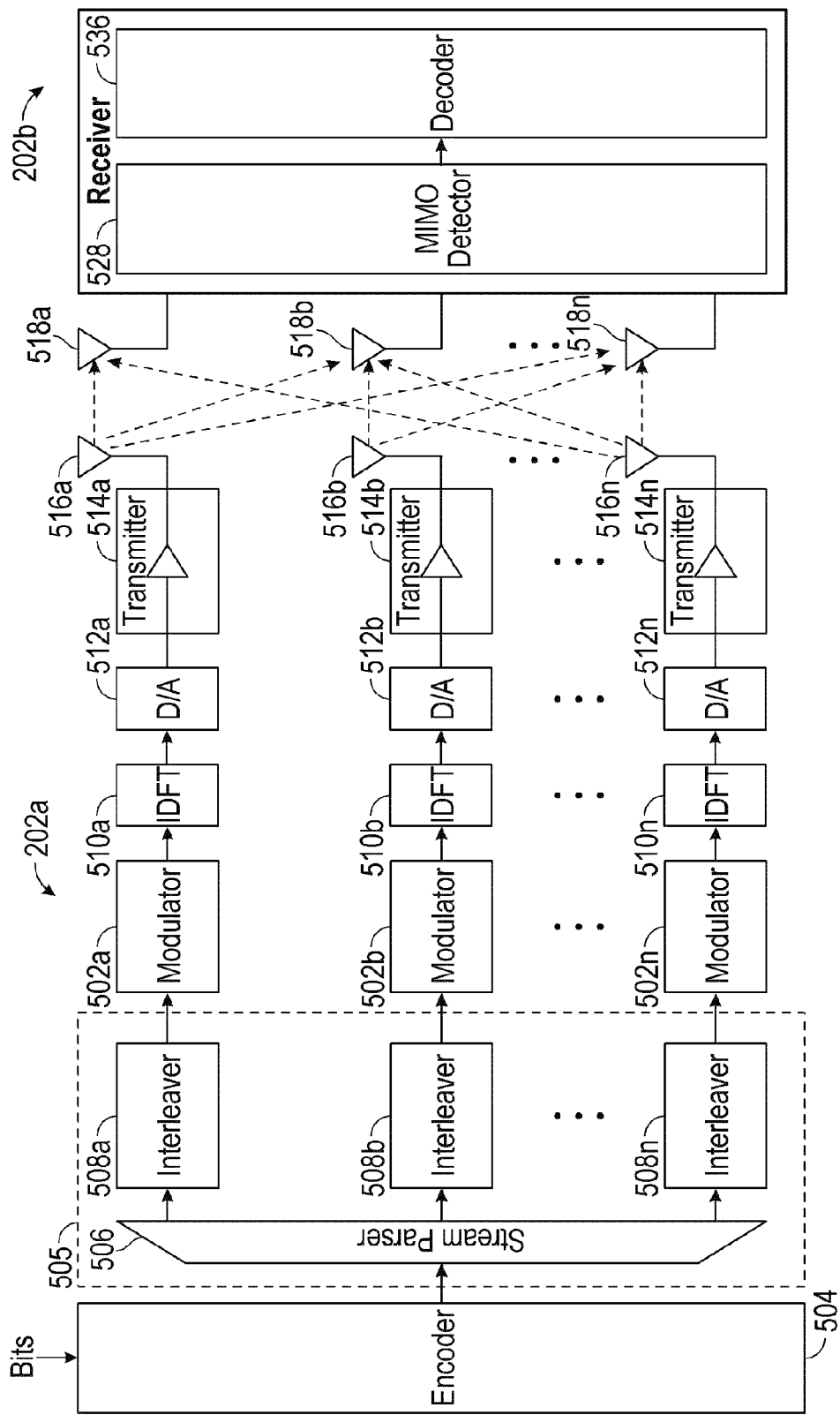
FIG. 5 is a functional block diagram of an exemplary MIMO system that may be implemented in wireless devices such as the wireless device of FIG. 2 to transmit wireless communications.

FIG. 5 is a functional block diagram of a MIMO system that may be implemented in wireless devices such as the wireless device 202 of FIG. 2 to transmit and receive wireless communications. The MIMO system may make use of some or all of the components described with reference to FIG. 3. Bits for transmission that are to be received at an output of the receiver are provided to an encoder 504. The encoder 504 may apply a forward error correcting (FEC) code on the bit stream. The FEC code may be a block code, a convolutional code, or the like. The encoded bits are provided to an interleaving system 505 that distributes the encoded bits into N transmit streams.

The interleaving system 505 includes a stream parser 506 that parses an input bit stream from the encoder 504 to N spatial stream interleavers 508a, 508b, and 508n. The stream parser 506 may be provided with the number of spatial streams and parse bits on a round-robin basis. Other parsing functions may also be used. One parsing function that may be used is $k_n = N_{TX}*k+n$ (i.e., round-robin with one bit per spatial stream, then on to the next spatial stream where is the input bit index and $N_{TX}$ is the number of transmitters/spatial streams). Another more general function f(k,n) might also be used, for example, sending two bits to a spatial stream, then moving on to the next spatial stream. Each interleaver 508a, 508b, and 508n may each thereafter distribute bits so that errors may be recovered due to fading or other channel conditions. Hereinafter, the interleavers 508a, 508b, and 508n may be referred to as interleaver 508.

Each transmit stream may then be modulated by a modulator 502a, 502b, or 502n. As described above with reference to FIG. 3, the bits may be modulated using modulation techniques such as QPSK (Quaternary Phase Shift Keying) modulation, BPSK (mapping one bit at a time), 16-QAM (mapping groups of six bits), 64-QAM, and the like. The modulated bits for each stream may be provided to transform modules 510a, 510b, and 510n. In some implementations, the transform modules 510a, 510b, and 510n may perform an inverse discrete time Fourier transform (IDFT) to convert the modulated bits from a frequency domain into a time domain. The transform modules 510a, 510b, and 510n may operate according to different modes as described above with reference to FIG. 3. For example, the transform modules 510a, 510b, and 510n may be configured to operate according to a 256 point mode, a 512 point mode, and/or a 1,024 point mode. In some implementations, the modulated bits may be encoded using space time block coding (STBC) and spatial mapping may be performed before being provided to transform modules 510a, 510b, and 510n. After the modulated bits have been converted into time domain signals for each spatial stream, the time domain signal may be converted into an analog signal via converters 512a, 512b, and 512n as described above with reference to FIG. 3. The signals may then be transmitted using transmitters 514a, 514b, or 514c and using antennas 516a, 516b, or 516n, into a wireless radio space over a desired frequency bandwidth (e.g., 1 MHz, 2 MHz, 4 MHz, 8 MHz, and 16 MHz, or higher).

In some embodiments, antennas 516a, 516b, and 516n are distinct and spatially separated antennas. In other embodiments, distinct signals might be combined into different polarizations off of fewer than N antennas. An example of this is where spatial rotation or spatial spreading is done, where multiple spatial streams are mapped on a single antenna. In any case, it should be understood that distinct spatial streams can be organized in different manners. For example, a transmit antenna might carry data from more than one spatial stream or several transmit antennas might carry data from a single spatial stream. For example, consider the case of a transmitter with four transmit antennas and two spatial streams. Each spatial stream can be mapped onto two transmit antennas in that case, so two antennas are carrying data from just one spatial stream.

Figure 6:
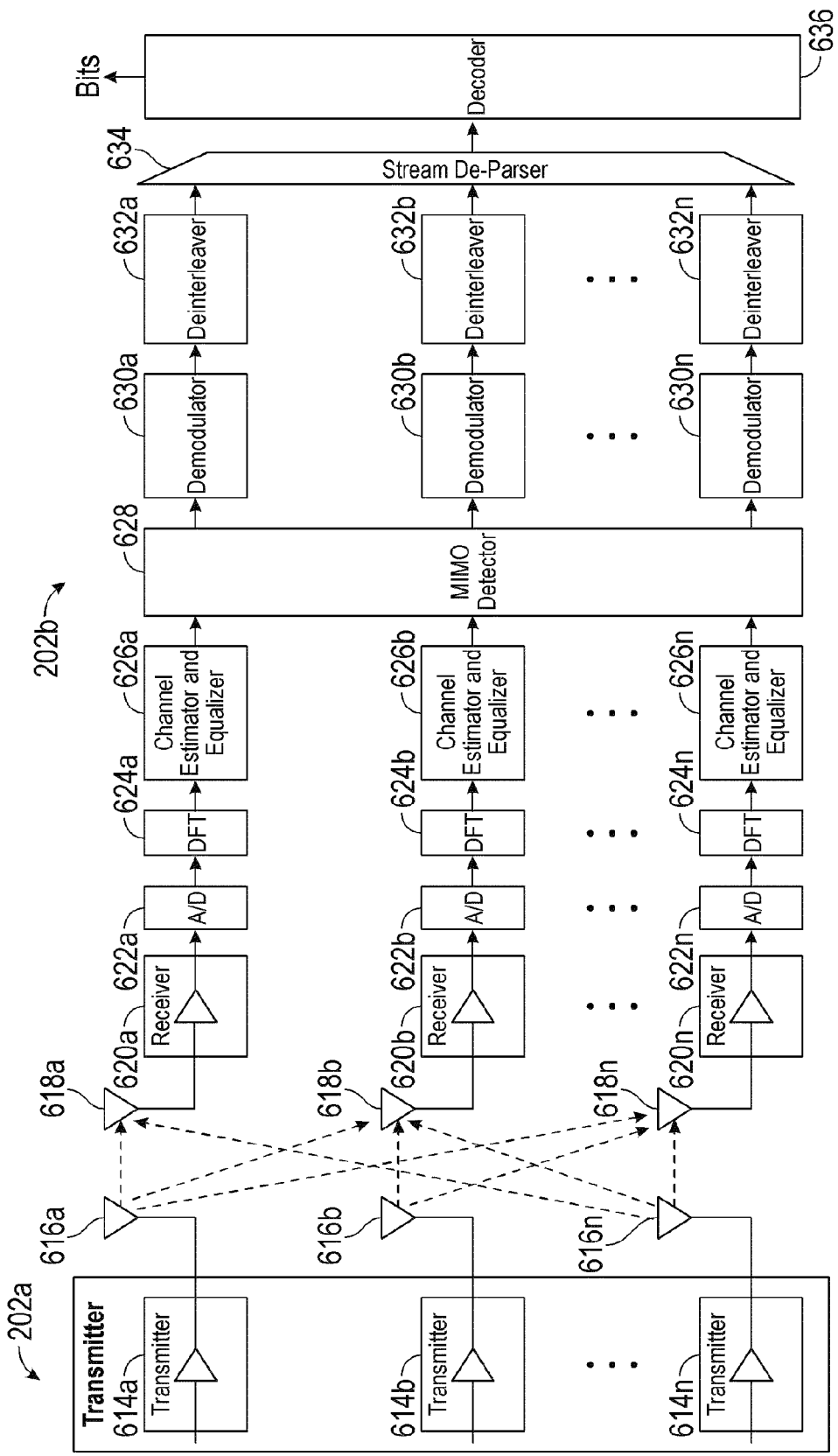
FIG. 6 is a functional block diagram of an exemplary MIMO system that may be implemented in wireless devices such as the wireless device of FIG. 2 to receive wireless communications.

FIG. 6 is a functional block diagram of an exemplary MIMO system that may be implemented in wireless devices such as the wireless device 202 of FIG. 2 to receive wireless communications. The wireless device 202b may be configured to simultaneously receive transmissions from the antennas 516a, 516b, and 516n of FIG. 5. A wireless device 202b receives signals from the channel at N antennas 518a, 518b, and 518n (counting separate polarizations, as appropriate) coupled to N receive circuits. The signals are then provided to receivers 620a, 620b, and 620n that each may include an amplifier configured to amplify the received signals. The signals may then be converted into a digital form via converters 622a, 622b, and 622n.

Converted signals may then be converted to a frequency spectrum via transform modules 624a, 624b, and 624n. As described above, the transform modules 624a, 624b, and 624n may operate according to various modes according to the size and bandwidth used (e.g., 256 point, 512 point, 1,024 point, etc.). The transformed signals may be provided to respective channel estimator and equalizer blocks 626a, 626b, and 626n that may function similarly as described above with reference to FIG. 4. After channel estimation, the outputs may be provided to a MIMO detector 628, which may thereafter provide its output to demodulators 630a, 630b, and 630n, which may demodulate the bits according to one of the modulation techniques as described above. Demodulated bits may then be provided to deinterleavers 632a, 632b, and 632n, which may pass bits into a stream de-parser 634, which may provide the bits into a single bit stream into a decoder 636 that may decode the bits into an appropriate data stream.

As described above, data units exchanged by the AP 104 and the STA 106 may include control information or data in the form of physical (PHY) layer packets or physical layer protocol data units (PPDUs).

Figure 7:
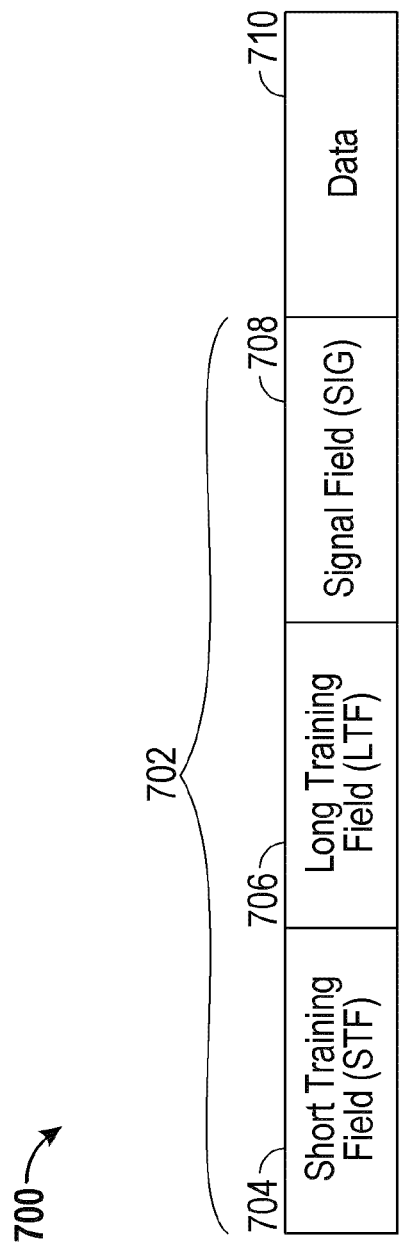
FIG. 7 is a block diagram showing an exemplary structure of a preamble and payload of a physical layer packet.

FIG. 7 is a block diagram showing an exemplary structure of a preamble 702 and payload 710 of a physical layer packet 700. The preamble 702 may include a short training field (STF) 704 that includes an STF sequence of known values (referred to herein as a "short"). In some aspects, the STF may be used for packet detection (e.g., to detect the start of a packet), receive power estimation, antenna selection, and for coarse time/frequency estimation. The STF sequence may be optimized to have a low peak-to-average power ratio ("PAPR") and include a subset of non-zero tones with a particular periodicity. The STF 704 may span one or multiple OFDM symbols. In some embodiments, the STF 704 can include multiple repeated STF sequences ("shorts"). For example, the STF 704 can include between around 1-20 shorts, and more particularly around 10 shorts.

The preamble 702 may further include a long training field (LTF) 706 that may span one or more OFDM symbols and may include one or more LTF sequences of known, non-zero values. The LTF may be used for channel estimation, fine time/frequency estimation, and mode detection. The preamble 702 may further include a signal field (SIG) 708 as described above that may include a number of bits or values used in one aspect for mode detection purposes and determination of transmission parameters.

As discussed above, various aspects described herein can be used for wireless communication in a power-limited frequency band. For example, rules, regulations, or standards may limit an allowed transmit power. Accordingly, received signal strength may be relatively weak. In certain aspects, a receiving device can include a plurality of antennas having receive diversity. The receiving device can select the antenna with the highest received signal strength. In determining the signal strength of each antenna, the receiving device can selectively connect each antenna to a single receive front-end. Including a single receive front-end for a set of multiple antennas can reduce the power consumption, area, and complexity of the receiver. However, if an antenna with poor reception is selected when a frame is transmitted to the receiver, the receiver may not detect the frame. In an embodiment, various aspects described herein can use an extended training preamble that can increase the likelihood that the receiving device will detect the frame.

Figure 8:
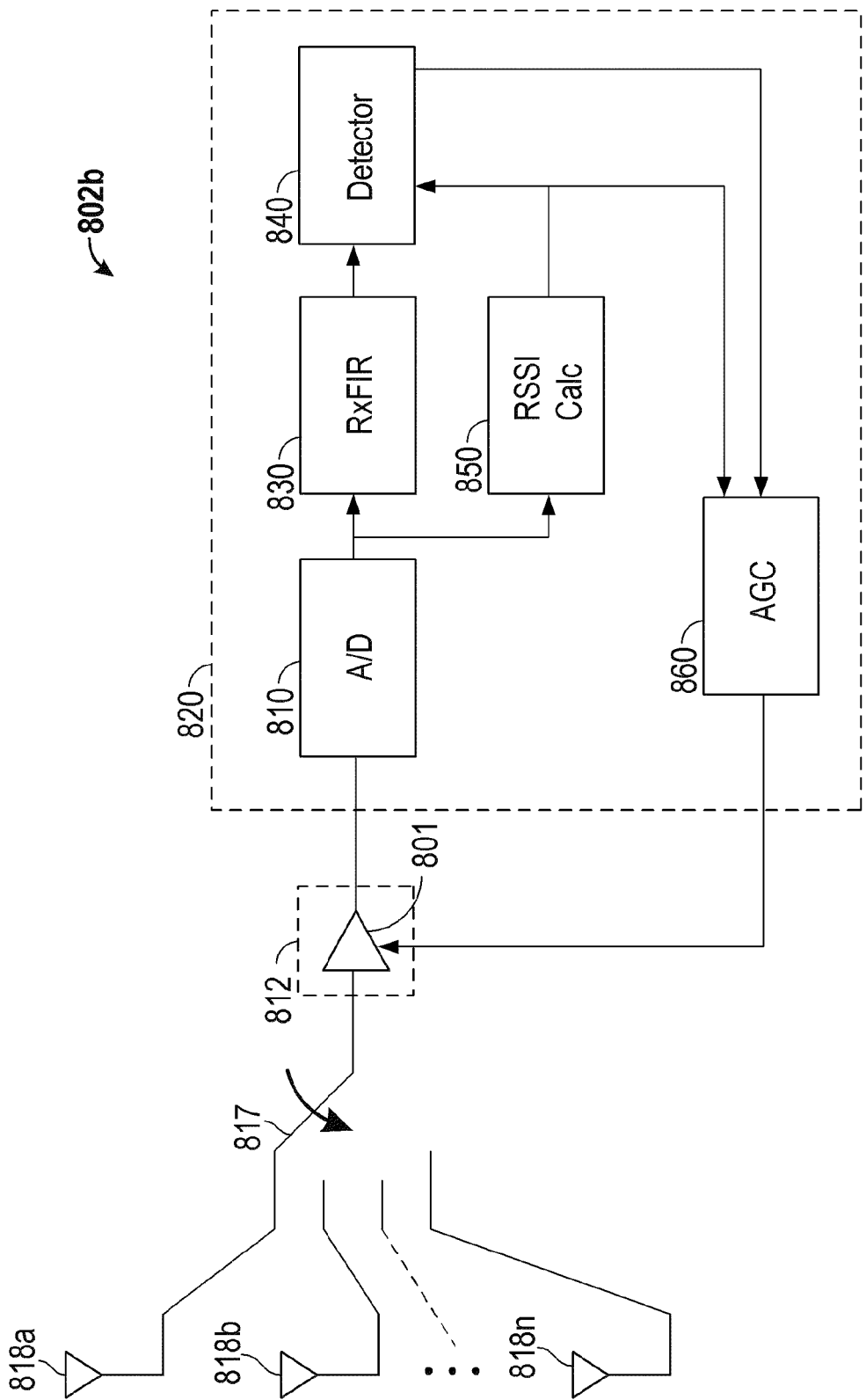
FIG. 8 illustrates various components that may be utilized in the wireless device to receive wireless communications, according to another embodiment.

FIG. 8 illustrates various components that may be utilized in the wireless device 202 to receive wireless communications, according to another embodiment. The components illustrated in FIG. 8 may be used, for example, to receive OFDM communications. In some aspects, the components illustrated in FIG. 8 are used to receive data units having an adjustable preamble, as will be discussed in additional detail below. For example, the components illustrated in FIG. 8 may be used to receive data units transmitted by the components discussed above with respect to FIG. 3. For ease of reference, the wireless device 202 configured with the components illustrated in FIG. 8 is hereinafter referred to as a wireless device 802b.

In the illustrated embodiment, the wireless device 802b includes a receiver 812, an analog-to-digital converter (ADC) 810, an antenna switch 817, a plurality of antennas 818a-818n, a receive finite impulse response (RxFIR) filter 830, a frame detector 840, a received signal strength indication (RSSI) calculator 850, and an automatic gain control 860.

In an embodiment, the antennas 818a-818n can have a mutual receive diversity. In other words, one or more of the antennas 818a-818n can have a different configuration, e.g., a spatial location, an orientation, a tuning, a directionality, etc. For example, the antennas 818a-818n can be arranged in a sectored pattern. In various embodiments, the antennas 818a-818n can substitute for any other single antenna described herein. For example, one or more of the antennas 216 (FIG. 2), 518a-518n (FIG. 5), and/or 618a-618n (FIG. 6) can each include an embodiment of the antennas 818a-818n and the antenna switch 817 and can be used according to the methods described herein.

The antenna switch 817 serves to selectively connect the antennas 818a-818n to the receive front-end and particularly to the amplifier 801 in the illustrated embodiment. In an embodiment, the antenna switch 817 can be controlled by the processor 204 (FIG. 2) or dedicated selection circuitry (not shown) implementing one or more of the methods described herein. In some embodiments, the wireless device 802b can, for example, operate in a scanning or listening mode. In the scanning or listening mode, the wireless device 802b can listen for packets. The antenna switch 817 can switch between the antennas 818a-818n using various methods, e.g., in a round-robin order, a random order, an order weighted by historical reception strength, etc. The antenna switch 817 can select each antenna 818a-818n for the period of one STF 704 (FIGS. 7 and 9), referred to herein as "T_stf."

The receiver 812 is configured to receive one or more packets or data units in a wireless signal. Data units that may be received and decoded or otherwise processed as discussed below are described in additional detail with respect to FIGS. 5-14.

In the aspect illustrated in FIG. 8, the receiver 812 includes a receive amplifier 801. The receive amplifier 801 may be configured to amplify the wireless signal received by the receiver 812. In some aspects, the receiver 812 is configured to adjust the gain of the receive amplifier 801 using an automatic gain control (AGC) procedure. In some aspects, the automatic gain control 860 uses information in one or more received training fields, such as a received short training field (STF) for example, to adjust the gain. Those having ordinary skill in the art will understand methods for performing AGC. In some aspects, the amplifier 801 includes an LNA. In an embodiment, when the wireless device 802b is in the scanning mode the AGC 860 can set the amplifier 801 to a maximum gain.

The wireless device 802b may include an analog to digital converter 810 configured to convert the amplified wireless signal from the receiver 812 into a digital representation thereof. Before being converted by the analog to digital converter 810, the wireless signal may be processed, for example, by being filtered or by being downconverted to an intermediate or baseband frequency. The analog to digital converter 810 may be implemented in the processor 204 (FIG. 2) or in another element of the wireless device 802b. In some aspects, the analog to digital converter 810 is implemented in the transceiver 214 (FIG. 2) or in a data receive processor.

The RxFIR filter 830 serves to process the digitized signal from the ADC 820. The RxFIR filter 830 can be implemented, for example, by the DSP 220 (FIG. 2), the processor 204 (FIG. 2), and/or the transform module 404 (FIG. 4). The RSSI calculator 850 serves to estimate receive power for the selected antenna 818a-818n. In some aspects, the RSSI calculator 850 uses information in one or more received training fields, such as a short training field (STF) for example, to estimate receive power. The RSSI calculator 850 can be implemented, for example, by the DSP 220 (FIG. 2), the processor 204 (FIG. 2), and/or the channel estimator 405 (FIG. 4).

Figure 9:
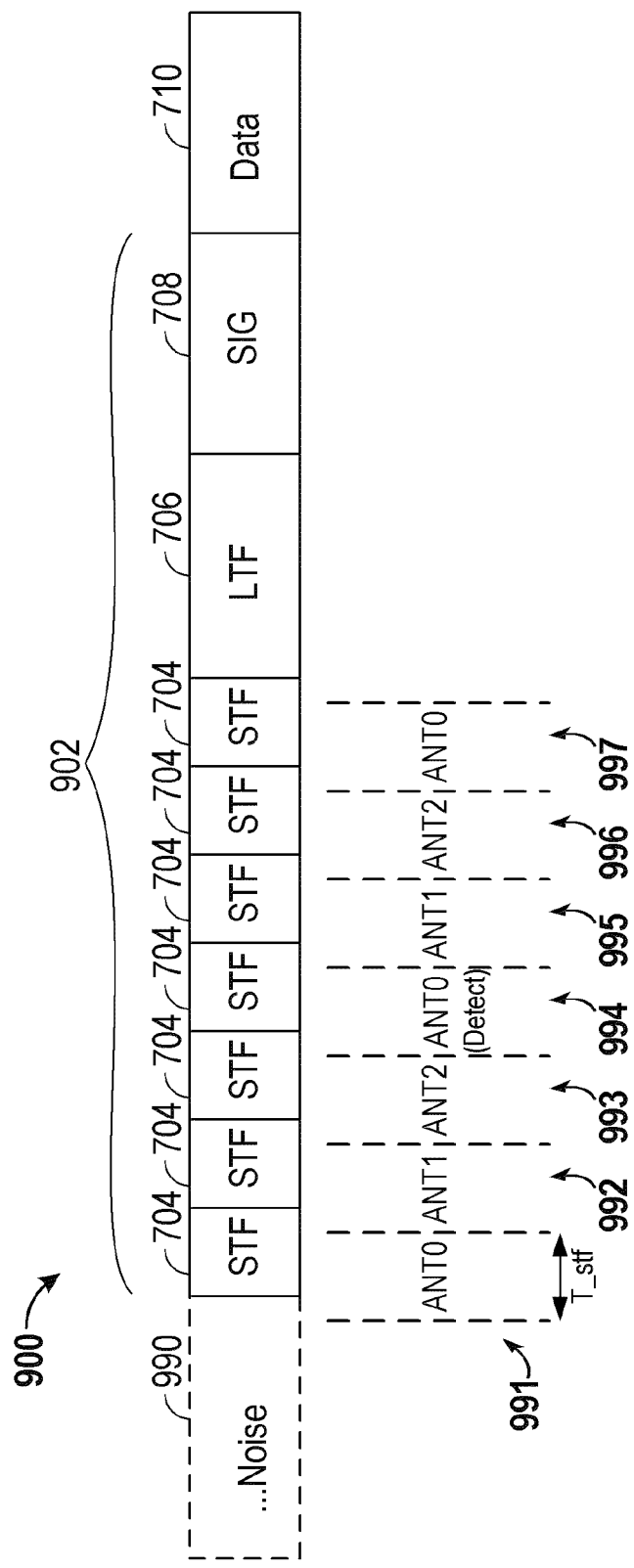
FIG. 9 is a block diagram showing another exemplary structure of a preamble and payload of a physical layer packet.

The detector 840 serves to detect a frame. For example, the detector 840 can be configured to trigger on the known pattern in the STF 704 (FIGS. 7 and 9). Upon detection, the processor 204 (FIG. 2) can cause the antenna switch 817 to select each antenna 818a-818n in turn, and the RSSI calculator 850 can determine receive power estimates for each antenna 818a-818n. In an embodiment, the antenna switch 817 can select each antenna 818a-818n for about T_stf.

The antenna switch 817 can be configured to select the antenna 818a-818n with the highest receive power estimate. The AGC 860 can set the antenna 818a-818n gain at the amplifier 801, based on the receive power estimate. In an embodiment, after the AGC 860 sets the antenna 818a-818n gain, the wireless device 802b can perform one or more frequency, DC, and time estimation procedures.

In FIG. 8, the ADC 810, the RxFIR filter 830, the detector 840, the RSSI calculator 850, and the AGC 860 are illustrated as being implemented in a DSP 820. In some aspects, however, one or more of ADC 810, the RxFIR filter 830, the detector 840, the RSSI calculator 850, and the AGC 860 are implemented independently in the processor 204 (FIG. 2) or in another element of the wireless device 202 (FIG. 2).

As discussed above, the antenna switch 817 switches between the antennas 818a-818n in the listening mode. However, if an antenna with poor reception is selected when a frame is transmitted to the wireless device 802b, the detector 840 may not detect the frame. Moreover, if transmission of the STF 704 (FIGS. 7 and 9) ends before the RSSI calculator 850 has determined a receive power estimation for each antenna 818a-818n, the processor 204 may not be able to choose the antenna 818a-818n with the highest expected signal strength. In some embodiments, the preambles 702 and 902 (FIGS. 7 and 9) can include a plurality of STFs 704. In particular, the preambles 702 and 902 can include at least one STF 704 per receive antenna 818a-818n. For example, the preambles 702 and 902 can include twice as many STFs 704 as receive antennas 818a-818n, twice as many STFs 704 as receive antennas 818a-818n minus one, or twice as many STFs 704 as receive antennas 818a-818n plus one.

FIG. 9 is a block diagram showing another exemplary structure of a preamble 902 and payload 710 of a physical layer packet 900. The illustrated embodiment corresponds to a wireless device 802b (FIG. 8) having three antennas, referred to with respect to FIG. 9 as ANT0, ANT1, and ANT2. The preamble 902 includes seven STFs 704 (i.e., two times the number of receive antennas, plus one). The preamble 702 further includes the long training field (LTF) and the signal field (SIG) 708 as described above with respect to FIG. 7.

In an exemplary sequence of events, a transmit channel may include noise 990 before the packet 900 is transmitted, for example, by the transmitter 210 (FIG. 2). The antenna switch 817 (FIG. 8) can select the antenna ANT0 for a first time period 991, before the transmitter 210 transmits the first STF 704. Accordingly, the detector 840 (FIG. 8) may not detect the packet 900. The antenna switch 817 can select the antenna ANT1 for a second time period 992. However, the antenna ANT1 may not be pointed towards the transmitter 210, and therefore may not receive a strong enough signal for the detector 840 to detect the packet 900. Similarly, the antenna switch 817 can select the antenna ANT2 for a third time period 993. However, the antenna ANT2 may not be pointed towards the transmitter 210, and therefore may not receive a strong enough signal for the detector 840 to detect the packet 900.

The antenna switch 817 (FIG. 8) can select the antenna ANT0 again for a fourth time period 994. Because the preamble 902 includes at least one more STF 704 than the number of receive antennas, the antenna ANT0 may receive a strong enough signal for the detector 840 to detect the packet 900. Accordingly, the RSSI calculator 850 (FIG. 8) can estimate a receive power at the antenna ANT0, which can be stored in the memory 206 (FIG. 2).

The antenna switch 817 (FIG. 8) can select the antenna ANT1 again for a fifth time period 995. Because the preamble 902 includes at least two more STFs 704 than the number of receive antennas, the RSSI calculator 850 (FIG. 8) can estimate a receive power at the antenna ANT1, which can be stored in the memory 206 (FIG. 2). Similarly, the antenna switch 817 (FIG. 8) can select the antenna ANT2 again for a sixth time period 995. Because the preamble 902 includes at least twice as many STFs 704 as the number of receive antennas, the RSSI calculator 850 (FIG. 8) can estimate a receive power at the antenna ANT2, which can be stored in the memory 206 (FIG. 2).

In an embodiment, the RSSI calculator 850 (FIG. 8) may not estimate the receive power at the antenna ANT0 upon first detection of the packet 900. In an embodiment, the antenna switch 817 (FIG. 8) can select the antenna ANT0 again at a seventh time period 997, and the RSSI calculator 850 can estimate a receive power at the antenna ANT0, which can be stored in the memory 206 (FIG. 2). In various embodiments, additional STFs 704 can be included in the packet 900, and the RSSI calculator 850 (FIG. 8) can estimate a receive power at each antenna more than one time. In an embodiment, the time periods 991-997 can last for about the period T_stf.

In some embodiments, the detector 840 (FIG. 8) may use more time to detect the frame than the RSSI calculator 850 (FIG. 8) uses to estimate a receive power. Accordingly, in some embodiments, the STFs after detection can be shorter than the STFs before detection. Particularly, the preamble can include a detection STF (DSTF) having a first length T_stf1, and an estimation STF (ESTF) having a second length T_stf2. T_stf1 can be greater than T_stf2. In various embodiments, the DSTFs and ESTFs can include multiple repeated STF sequences or shorts. For example, T_stf1 can include between around 1-20 shorts, and more particularly around 10 shorts. T_stf2 can include between around 1-10 shorts, and more particularly around 5 shorts. Thus, in an embodiment, T_stf1 can be twice as long as T_stf2.

The preamble can include a number of DSTFs at least equal to the number of receiving antennas per receive front-end. In an embodiment, the preamble can include a number of DSTFs equal to the number of receiving antennas. In an embodiment, the preamble can include a number of DSTFs equal to the number of receiving antennas plus or minus one.

The preamble can include a number of ESTFs less than the number of receiving antennas per receive front-end. In an embodiment, the preamble can include a number of ESTFs equal to the number of receiving antennas. In an embodiment, the preamble can include a number of ESTFs equal to the number of receiving antennas plus or minus one.

Figure 10:
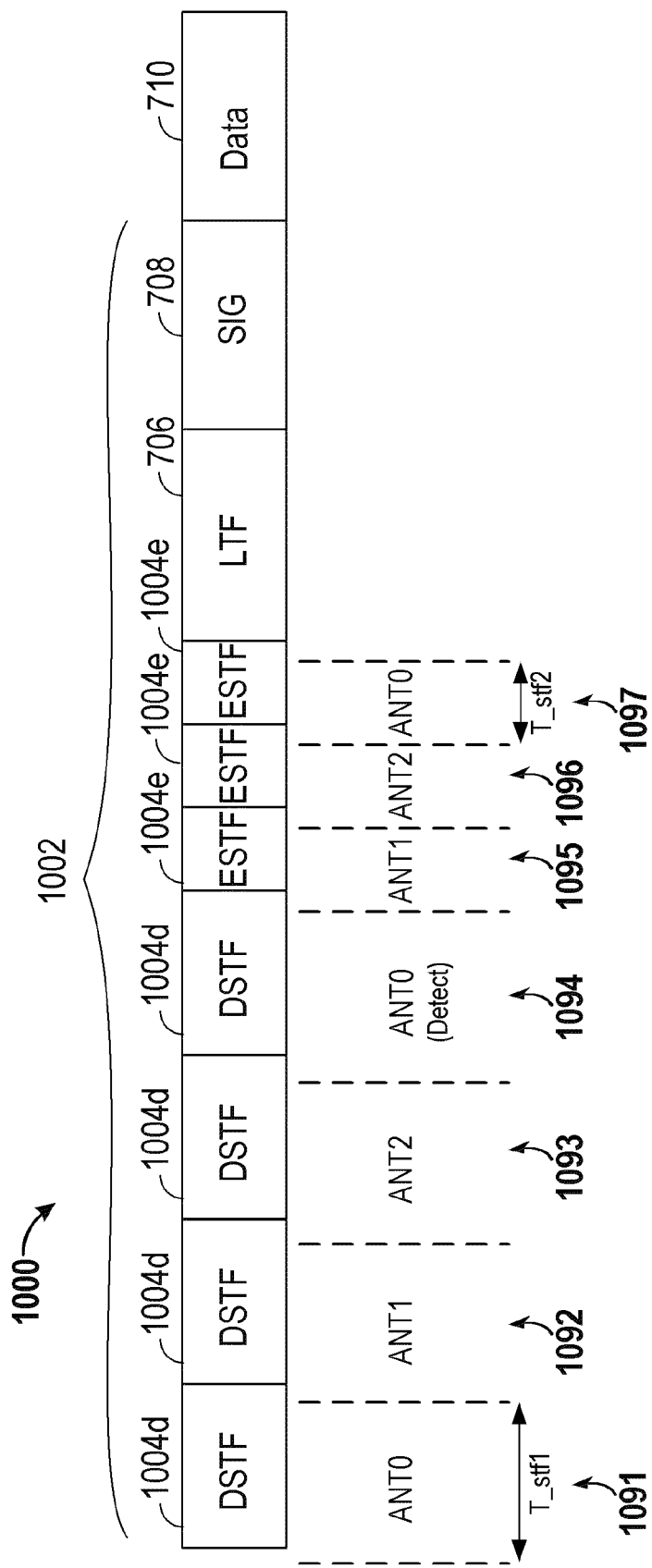
FIG. 10 is a block diagram showing another exemplary structure of a preamble and payload of a physical layer packet.

FIG. 10 is a block diagram showing another exemplary structure of a preamble 1002 and payload 710 of a physical layer packet 1000. The illustrated embodiment corresponds to a wireless device 802b (FIG. 8) having three antennas, referred to with respect to FIG. 9 as ANT0, ANT1, and ANT2. The preamble 1002 includes seven STFs 1004d and 1004e of various lengths (two times the number of receive antennas, plus one). Particularly, the preamble 1002 includes four DSTFs 1004d (the number of receive antennas, plus one) and three ESTFs 1004e (the number of receive antennas). The preamble 702 further includes the long training field (LTF) and the signal field (SIG) 708 as described above with respect to FIG. 7.

In an exemplary sequence of events, the antenna switch 817 (FIG. 8) can select the antenna ANT0 for a first time period 1091, before the transmitter 210 transmits the first DSTF 1004d. Accordingly, the detector 840 (FIG. 8) may not detect the packet 1000. The antenna switch 817 can select the antenna ANT1 for a second time period 1092. However, the antenna ANT1 may not be pointed towards the transmitter 210, and therefore may not receive a strong enough signal for the detector 840 to detect the packet 1000. Similarly, the antenna switch 817 can select the antenna ANT2 for a third time period 1093. However, the antenna ANT2 may not be pointed towards the transmitter 210, and therefore may not receive a strong enough signal for the detector 840 to detect the packet 1000.

The antenna switch 817 (FIG. 8) can select the antenna ANT0 again for a fourth time period 1094. Because the preamble 1002 includes at least one more STF 704 than the number of receive antennas, the antenna ANT0 may receive a strong enough signal for the detector 840 to detect the packet 1000. Accordingly, the RSSI calculator 850 (FIG. 8) can estimate a receive power at the antenna ANT0, which can be stored in the memory 206 (FIG. 2).

The antenna switch 817 (FIG. 8) can select the antenna ANT1 again for a fifth time period 1095. The RSSI calculator 850 (FIG. 8) can estimate a receive power at the antenna ANT1, which can be stored in the memory 206 (FIG. 2), based on the shorter ESTF 1004e. Similarly, the antenna switch 817 (FIG. 8) can select the antenna ANT2 again for a sixth time period 1095. The RSSI calculator 850 (FIG. 8) can estimate a receive power at the antenna ANT2, which can be stored in the memory 206 (FIG. 2), based on the shorter ESTF 1004e.

In an embodiment, the RSSI calculator 850 (FIG. 8) may not estimate the receive power at the antenna ANT0 upon first detection of the packet 1000. In an embodiment, the antenna switch 817 (FIG. 8) can select the antenna ANT0 again at a seventh time period 1097, and the RSSI calculator 850 can estimate a receive power at the antenna ANT0, which can be stored in the memory 206 (FIG. 2). In various embodiments, additional ESTFs 1004e can be included in the packet 1000, and the RSSI calculator 850 (FIG. 8) can estimate a receive power at each antenna more than one time. In various embodiments, the time periods 1091-1094 can last for about the period T_stf1, and the time periods 1095-1097 can last for about the period T_stf2.

In an embodiment, preambles including multiple STFs, DSTFs, and/or ESTFs can be referred to as training preambles, which can be included in training packets. Preambles with relatively fewer STFs, such as for example one STF, can be referred to as data preambles, which can be included in data packets. In various embodiments, the AP 104 (FIG. 1) may use training preambles, such as the preambles 902 and/or 1002 described above with respect to FIGS. 9 and 10, while an STA 106a-106d is selecting one or a plurality of antennas. The AP 104 may use data preambles, such as the preamble 702 described above with respect to FIG. 7, after an STA 106a-106d has selected an antenna. In an embodiment, the STAs 106a-106d can be configured to request training preambles from the AP 104. In an embodiment, the STAs 106a-106d can be configured to request data preambles from the AP 104. In various embodiments, the AP 104 can default to either training preambles or data preambles and can transition to a different preamble type based on communication from an STA 106a-106d.

Figure 11:
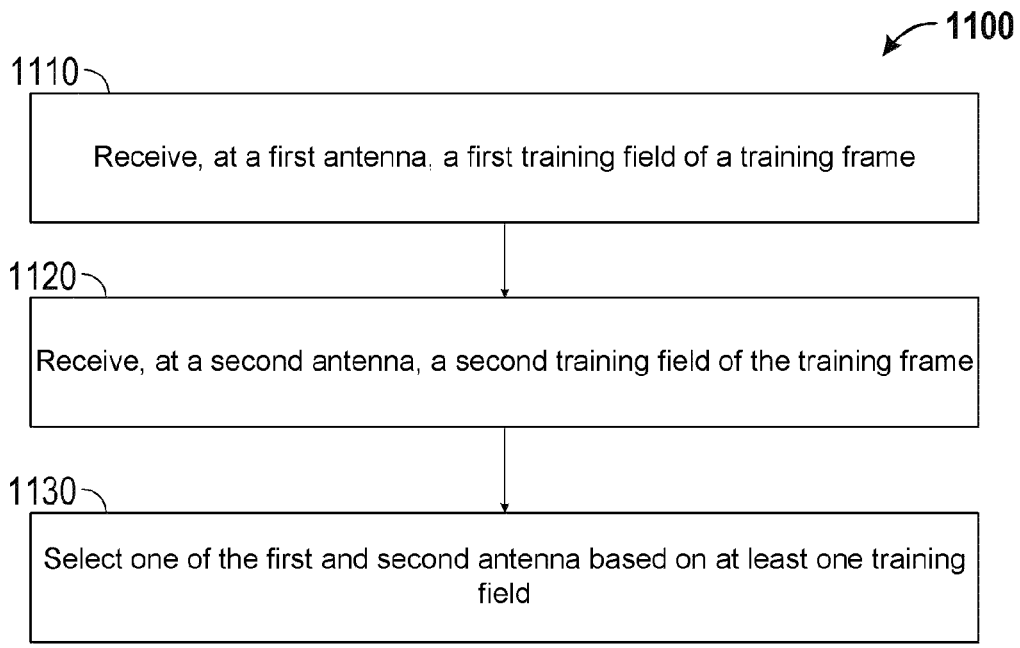
FIG. 11 is a flowchart of an exemplary method of selecting one of a plurality of antennas.

FIG. 11 is a flowchart 1100 of an exemplary method of selecting one of a plurality of antennas. Although the method of flowchart 1100 is described herein with reference to the wireless communication system 100 (FIG. 1), the wireless device 202 (FIG. 2), and the wireless device 802b (FIG. 8), a person having ordinary skill in the art will appreciate that the method of flowchart 1100 may be implemented by another device described herein, or any other suitable device. In an embodiment, the steps in flowchart 1100 may be performed by a processor or controller, e.g., the processor 204 (FIG. 2) or the DSP 220 (FIG. 2) in conjunction with the memory 206 (FIG. 2). Although the method of flowchart 1100 is described herein with reference to a particular order, in various embodiments, blocks herein may be performed in a different order, omitted, and/or additional blocks may be added.

First, at block 1110, the wireless device 802b receives, at a first antenna 818a, a first training field of a training frame. The first training field can be a short training field, such as DSTF 1004d, as discussed above with respect to FIG. 10. For example, the first training field can be the DSTF 1004d received in the time period 1094. The detector 840 can detect the frame 1000 based on the DSTF 1004d. In an embodiment, the RSSI calculator 850 can determine a received signal strength at the first antenna 818a, based on the first training field, which it can store in the memory 206.

Next, at block 1120, the wireless device 802b receives, at a second antenna 818b, a second training field of the training frame. The second training field can be a short training field, such as ESTF 1004e, as discussed above with respect to FIG. 10. For example, the second training field can be the ESTF 1004e received in the time period 1095. Accordingly, the second training field can be shorter than the first training field. The RSSI calculator 850 can determine a received signal strength at the second antenna 818b, based on the second training field, which it can store in the memory 206.

Then, at block 1130, the processor 204 selects one of the first and second antenna based on at least one training field (e.g., a short training field). For example, the processor 204 can cause the antenna switch 817 to select the antenna with the strongest signal strength. In an embodiment, the processor 204 can select one of the first and second antenna 818a-818b based on the received signal strengths associated with the first and second training fields (e.g., short training fields).

In an embodiment, the first antenna 818a can receive a third training field, which could be a short training field such as the ESTF 1004e received during the time period 1097. The RSSI calculator 850 can determine a received signal strength at the first antenna 818a, based on the third training field, which it can store in the memory 206. Accordingly, the processor 204 can select one of the first and second antenna 818a-818b based on the received signal strengths associated with the second and third training field (e.g., short training fields)s.

In various embodiments, the training frame can include a number of training fields (e.g., short training fields) equal to or greater than two times the number of antennas associated with the receiver front-end. Particularly, the training frame can include a number of training fields equal to two times the number of the plurality of antennas, plus one. The first and second training fields can each include a plurality of sequences of values (e.g., shorts). In an embodiment, the first training field can include more sequences of values (e.g., shorts) than the second training field.

In an embodiment, the transmitter 210 can transmit a communication indicating that subsequent frames will be data frames. For example, the wireless device 802b can send a message to the AP 104 informing the AP 104 that the wireless device 802b is no longer in an antenna selection mode. As another example, the wireless device 802b can send a request to the AP 104 that subsequent frames be data frames. As another example, the AP 104 can be configured to transmit a preset or dynamically determined number of training frames before automatically reverting to data frames. The AP 104 can transmit the data frame, such as the frame 700 (FIG. 7). The wireless device 802b can receive the data frame at the selected antenna. The data frame can include fewer training fields (e.g., short training fields) than the training frame.

Figure 12:
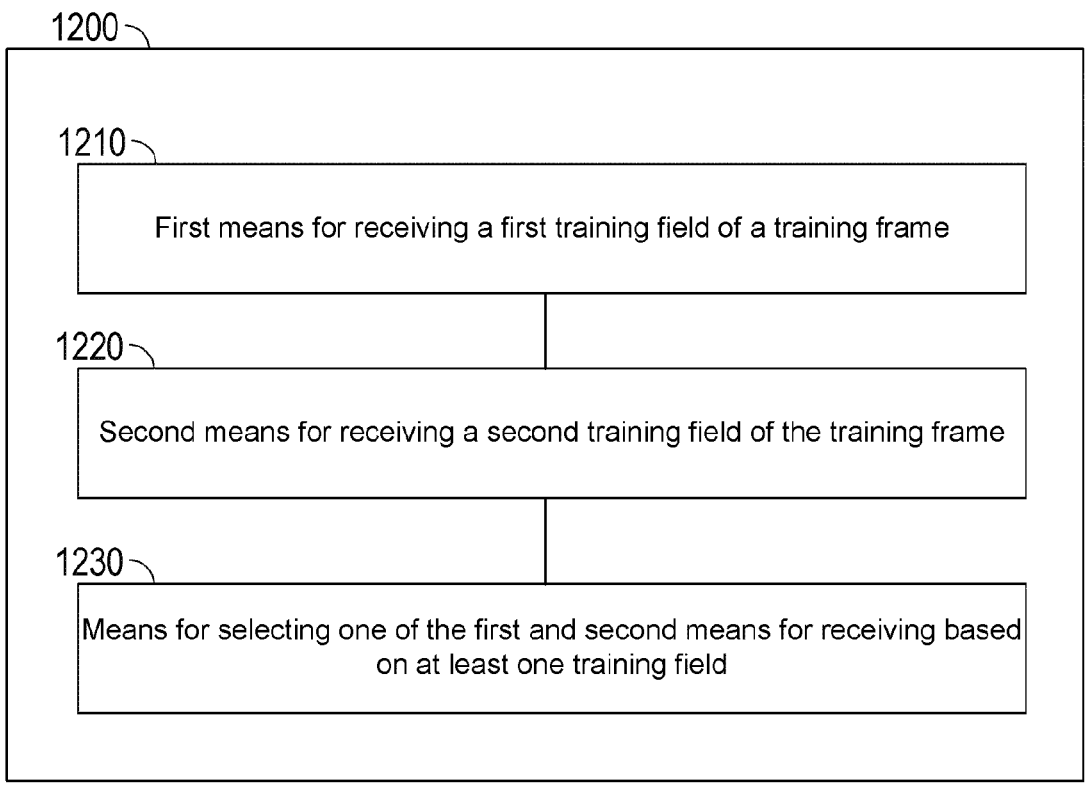
FIG. 12 is a functional block diagram of an apparatus for wireless communication, in accordance with an exemplary embodiment of the invention.

FIG. 12 is a functional block diagram of an apparatus for wireless communication 1200 in accordance with an exemplary embodiment of the invention. The apparatus for wireless communication 1200 includes only those components useful for describing some prominent features of implementations within the scope of the claims. Those skilled in the art will appreciate that an apparatus for wireless communication may have more components than the simplified apparatus 1200. The apparatus for wireless communication 1200 includes first means 1210 for receiving a first training field (e.g., short training field) of a training frame, second means 1220 for receiving a second training field (e.g., short training field) of the training frame, and means 1230 for selecting one of the first and second means 1210 and 1220 for receiving based on at least one training field (e.g., short training field).

In an embodiment, the first means 1210 for receiving a first training field of a training frame can be configured to perform one or more of the functions described above with respect to block 1110 (FIG. 11). In various embodiments, the first means 1210 for receiving a first training field (e.g., short training field) of a training frame can be implemented by one or more of the receivers 212 (FIG. 2) and 620a-620n (FIG. 6) and the antennas 216 (FIG. 2), 518a-518n (FIG. 5), 618a-618n (FIG. 6), and 818a-818n (FIG. 8).

In an embodiment, the second means 1220 for receiving a second training field of the training frame can be configured to perform one or more of the functions described above with respect to block 1120 (FIG. 11). In various embodiments, the second means 1220 for receiving a second training field of the training frame can be implemented by one or more of the receivers 212 (FIG. 2) and 620a-620n (FIG. 6) and the antennas 216 (FIG. 2), 518a-518n (FIG. 5), 618a-618n (FIG. 6), and 818a-818n (FIG. 8).

In an embodiment, the means 1230 for selecting one of the first and second means 1210 and 1220 for receiving based on at least one training field (e.g., short training field) can be configured to perform one or more of the functions described above with respect to block 1130 (FIG. 11). In various embodiments, the first means 1230 for selecting one of the first and second means 1210 and 1220 for receiving based on at least one training field can be implemented by one or more of the processor 204 (FIG. 2), the memory 206 (FIG. 2), the DSP 220 (FIG. 2), and the antenna switch 817 (FIG. 8).

Figure 13:
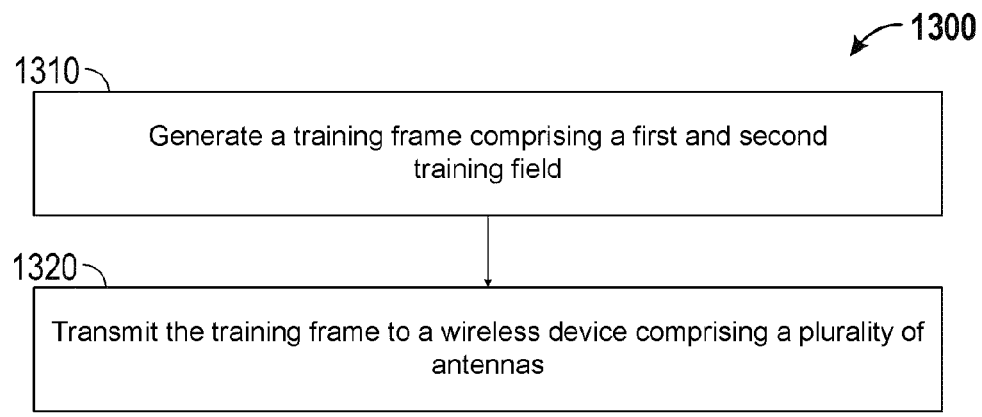
FIG. 13 is a flowchart of an exemplary method of wireless communication.

FIG. 13 is a flowchart 1300 of an exemplary method of wireless communication. Although the method of flowchart 1300 is described herein with reference to the wireless communication system 100 (FIG. 1), the wireless device 202 (FIG. 2), and the wireless device 802*b* (FIG. 8), a person having ordinary skill in the art will appreciate that the method of flowchart 1300 may be implemented by another device described herein, or any other suitable device. In an embodiment, the steps in flowchart 1300 may be performed by a processor or controller, e.g., the processor 204 (FIG. 2) or the DSP 220 (FIG. 2) in conjunction with the memory 206 (FIG. 2). Although the method of flowchart 1300 is described herein with reference to a particular order, in various embodiments, blocks herein may be performed in a different order, omitted, and/or additional blocks may be added.

First, at block 1310, the AP 104 generates a training frame. The training frame includes a first and second training field (e.g., short training fields). For example, the processor 204 (FIG. 2) can generate the training frame 1000 (FIG. 10). The first training field can be a short training field, such as DSTF 1004*d* (FIG. 10). The second training field can be an ESTF 1004*e* (FIG. 10). The processor 204 can store the training frame, for example, in the memory 206.

Next, at block 1320, the AP 104 transmits the training frame to the wireless device 802*b*, which includes the plurality of antennas 818*a*-818*b*. The AP 104 can transmit the training frame via, for example, the transmitter 210 and the antenna 216. The training frame includes a number of training fields (e.g., short training fields) equal to or greater than two times the number of the plurality of antennas 818*a*-818*n*. Particularly, the training frame can include a number of training fields equal to two times the number of the plurality of antennas, plus one. The first and second training fields can each include a plurality of sequences of values (e.g., shorts). In an embodiment, the first training field can include more sequences of values (e.g., shorts) than the second training field.

In an embodiment, the AP 104 can receive a communication indicating that subsequent frames will be data frames. For example, the AP 104 can receive a message from the wireless device 802*b* informing the AP 104 that the wireless device 802*b* is no longer in an antenna selection mode. As another example, the AP 104 can receive a request from the wireless device 802*b* that subsequent frames be data frames. As another example, the AP 104 can be configured to transmit a preset or dynamically determined number of training frames before automatically reverting to data frames. The AP 104 can transmit the data frame, such as the frame 700 (FIG. 7). The wireless device 802*b* can receive the data frame at the selected antenna. The data frame can include fewer training fields than the training frame.

Figure 14:
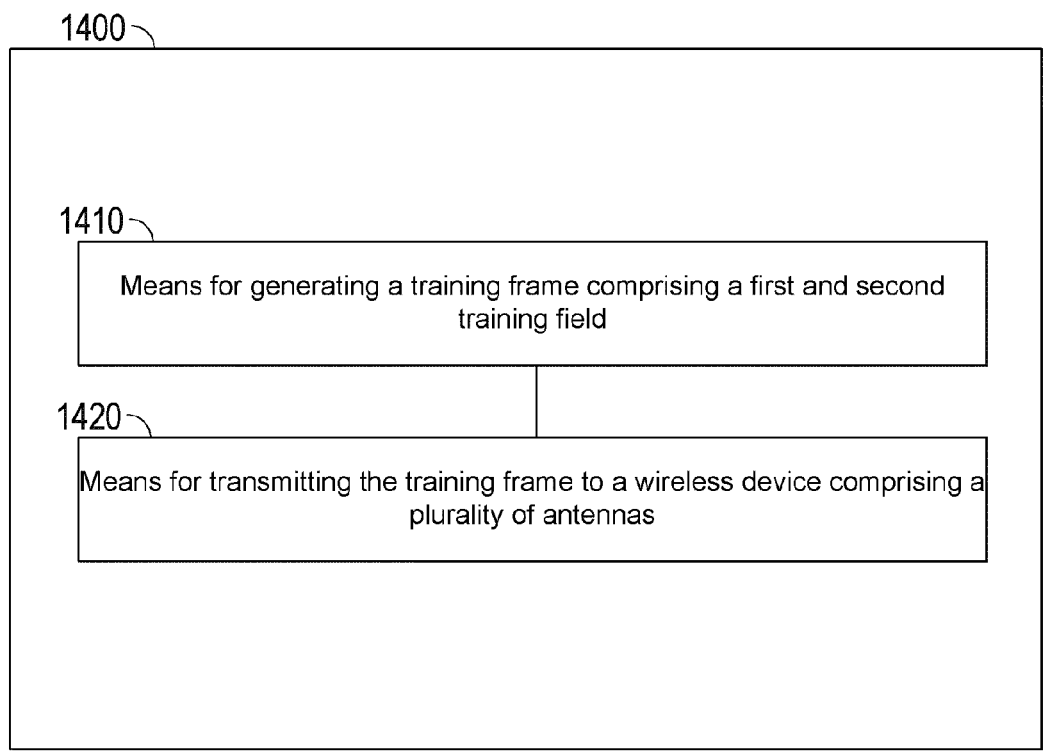
FIG. 14 is a functional block diagram of an apparatus for wireless communication, in accordance with an exemplary embodiment of the invention.

FIG. 14 is a functional block diagram of an apparatus for wireless communication 1400 in accordance with an exemplary embodiment of the invention. The apparatus for wireless communication 1400 includes only those components useful for describing some prominent features of implementations within the scope of the claims. Those skilled in the art will appreciate that an apparatus for wireless communication may have more components than the simplified apparatus 1400 shown in FIG. 14. The apparatus for wireless communication 1400 includes means 1410 for generating a training frame including a first and second training field and means 1420 for transmitting the training frame to a wireless device including a plurality of antennas.

In an embodiment, the means 1410 for generating a training frame including a first and second training field (e.g., short training field) can be configured to perform one or more of the functions described above with respect to block 1310 (FIG. 13). In various embodiments, the means 1410 for generating a training frame including a first and second training field can be implemented by one or more of the processor 204 (FIG. 2), the memory 206 (FIG. 2), and the DSP 220 (FIG. 2).

In an embodiment, the means 1420 for transmitting the training frame to a wireless device including a plurality of antennas can be configured to perform one or more of the functions described above with respect to block 1320 (FIG. 13). In various embodiments, the means 1420 for transmitting the training frame to a wireless device including a plurality of antennas can be implemented by one or more of the transmitters 210 (FIG. 2), 514*a*-514*n* (FIG. 5), and 614*a*-614*n* (FIG. 6) and the antennas 216 (FIG. 2), 516*a*-516*b* (FIG. 5), and 616*a*-616*n* (FIG. 6).

As used herein, the term "determining" encompasses a wide variety of actions. For example, "determining" may include calculating, computing, processing, deriving, investigating, looking up (e.g., in a table, a database, or another data structure), ascertaining and the like. "Determining" may also include receiving (e.g., information), accessing (e.g., data in a memory), and the like. "Determining" may also include resolving, selecting, choosing, establishing, and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, e.g., various hardware components, software components, circuits, and modules. Generally, any operations illustrated in the Figures may be performed by corresponding functional means capable of performing the operations.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. For example, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may include a computer program product for performing the operations presented herein. For example, such a computer program product may include a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded or otherwise obtained by a user terminal or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation, and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of selecting one of a plurality of antennas, comprising:
    receiving, at a first antenna, a first training field of a training frame;
    detecting the training frame based on the first training field;
    receiving, at a second antenna, a second training field of the training frame;
    determining a received signal strength at the second antenna based on the second training field;
    receiving at the first antenna a third training field of the training frame;
    determining a received signal strength at the first antenna, based on the third training field; and
    selecting one of the first and second antennas based on the determined received signal strengths.

2. The method of claim 1, wherein the training frame comprises a number of training fields equal to or greater than two times the number of the plurality of antennas.

3. The method of claim 1, wherein the training frame comprises a number of training fields equal to two times the number of the plurality of antennas, plus one.

4. The method of claim 1, wherein the first and second training fields each comprise a plurality of sequences of values.

5. The method of claim 4, wherein the first training field comprises more sequences of values than the second training field.

6. The method of claim 1, further comprising:
    transmitting a communication indicative that subsequent frames will be data frames; and
    receiving, at the selected antenna, a data frame,
    wherein the data frame comprises fewer training fields than the training frame.

7. The method of claim 1, further comprising selectively connecting the first and second antennas to a receiver of a wireless device.

8. The method of claim 1, further comprising using an antenna switch to selectively connect the first and second antennas to a receiver of a wireless device.

9. The method of claim 1, further comprising:
    amplifying an analog signal received from the first and second antennas;
    converting the analog signal to a digital signal;
    generating a receive power estimate for the selected antenna; and
    selecting one of the first and second antennas based on the receive power estimate.

10. A method of wireless communication, comprising:
    generating a training frame to be transmitted to a wireless device comprising a plurality of antennas, the training frame comprising at least a first, second, and third training field; and
    transmitting the training frame to the wireless device, such that the training frame is detectable by the wireless device based on the first training field, and such that a received signal strength at a first antenna of the wireless device is determinable based on the third training field, and such that a received signal strength at a second antenna of the wireless device is determinable based on the second training field, and such that one of the first and second antennas of the wireless device are selectable based on the determined received signal strengths, wherein the training frame comprises a number of training fields equal to or greater than two times the number of the plurality of antennas.

11. The method of claim 10, wherein the number of training fields is equal to two times the number of the plurality of antennas, plus one.

12. The method of claim 10, wherein the first and second training fields each comprise a plurality of sequences of values.

13. The method of claim 12, wherein the first training field comprises more sequences of values than the second training field.

14. The method of claim 10, further comprising:
    receiving a communication indicative that subsequent frames will be data frames; and
    transmitting a data frame,
    wherein the data frame comprises fewer training fields than the training frame.

15. A wireless device configured to select one of a plurality of antennas, comprising:
    a first antenna configured to receive a first and third training field of a training frame;
    a processor configured to detect the training frame based on the first training field;

a second antenna configured to receive a second training field of the training frame, wherein the processor is further configured to:
determine a received signal strength at the second antenna based on the second training field;
determine a received signal strength at the first antenna based on the third training field; and
select one of the first and second antennas based on the determined received signal strengths.

16. The device of claim 15, wherein the training frame comprises a number of training fields equal to or greater than two times the number of the plurality of antennas.

17. The device of claim 15, wherein the training frame comprises a number of training fields equal to two times the number of the plurality of antennas, plus one.

18. The device of claim 15, wherein the first and second training fields each comprise a plurality of sequences of values.

19. The device of claim 18, wherein the first training field comprises more sequences of values than the second training field.

20. The device of claim 15, further comprising:
a transmitter configured to transmit a communication indicative that subsequent frames will be data frames,
wherein the selected antenna is configured to receive a data frame, and
the data frame comprises fewer training fields than the training frame.

21. The device of claim 15, further comprising an antenna switch to selectively connect the first and second antennas to a receiver of the wireless device.

22. The device of claim 15, further comprising:
an amplifier to amplify an analog signal received from the first and second antennas;
an analog to digital converter to convert the analog signal to a digital signal; and
a calculator to generate a receive power estimate for the selected antenna, wherein an antenna switch is configured to select one of the first and second antennas based on the receive power estimate.

23. A device configured to communicate wirelessly, comprising:
a processor configured to generate a training frame to be transmitted to a wireless device comprising a plurality of antennas, the training frame comprising at least a first, second, and third training field; and
a transmitter configured to transmit the training frame to the wireless device such that the training frame is detectable by the wireless device based on the first training field, and such that a received signal strength at a first antenna of the wireless device is determinable based on the third training field, and such that a received signal strength at a second antenna of the wireless device is determinable based on the second training field, and such that one of the first and second antennas of the wireless device are selectable based on the determined received signal strengths, wherein the training frame comprises a number of training fields equal to or greater than two times the number of the plurality of antennas.

24. The device of claim 23, wherein the number of training fields is equal to two times the number of the plurality of antennas, plus one.

25. The device of claim 23, wherein the first and second training fields each comprise a plurality of sequences of values.

26. The device of claim 25, wherein the first training field comprises more sequences of values than the second training field.

27. The device of claim 23, further comprising:
a receiver configured to receive a communication indicative that subsequent frames will be data frames,
wherein the transmitter is further configured to transmit a data frame, and
the data frame comprises fewer training fields than the training frame.

28. A non-transitory computer-readable medium comprising code that, when executed, causes an apparatus to:
receive, at a first antenna, a first training field of a training frame;
detect the training frame based on the first training field;
receive, at a second antenna, a second training field of the training frame;
determine a received signal strength at the second antenna based on the second training field;
receive, at the first antenna, a third training field of the training frame;
determine a received signal strength at the first antenna, based on the third training field; and
select one of the first and second antenna based on the determined received signal strengths.

29. The medium of claim 28, wherein the training frame comprises a number of training fields equal to two times the number of the plurality of antennas, plus one.

30. The medium of claim 28, further comprising code that, when executed, causes the apparatus to:
transmit a communication indicative that subsequent frames will be data frames; and
receive, at the selected antenna, a data frame,
wherein the data frame comprises fewer training fields than the training frame.

31. A non-transitory computer-readable medium comprising code that, when executed, causes an apparatus to:
generate a training frame to be transmitted to a wireless device comprising a plurality of antennas, the training frame comprising at least a first, second, and third training field; and
transmit the training frame to the wireless device, such that the training frame is detectable by the wireless device based on the first training field, and such that a received signal strength at a first antenna of the wireless device is determinable based on the third training field, and such that a received signal strength at a second antenna of the wireless device is determinable based on the second training field, and such that one of the first and second antennas of the wireless device are selectable based on the determined received signal strengths, wherein the training frame comprises a number of training fields equal to or greater than two times the number of the plurality of antennas.

32. The medium of claim 31, wherein the number of training fields is equal to two times the number of the plurality of antennas, plus one.

33. The medium of claim 31, further comprising code that, when executed, causes the apparatus to:
receive a communication indicative that subsequent frames will be data frames; and
transmit a data frame,
wherein the data frame comprises fewer training fields than the training frame.

* * * * *